United States Patent [19]

Solomon

[11] 4,428,151

[45] Jan. 31, 1984

[54] PLANT WATERING AND HUMIDIFYING APPARATUS

[76] Inventor: Gary D. Solomon, 23 Harrow La., Levittown, N.Y. 11756

[21] Appl. No.: 212,203

[22] Filed: Dec. 2, 1980

[51] Int. Cl.³ ............................................. A01G 27/00
[52] U.S. Cl. ........................................ 47/81; 47/39
[58] Field of Search ................................ 47/79–81, 47/39; 239/44, 145

[56] References Cited

U.S. PATENT DOCUMENTS

| 1,342,786 | 6/1920 | White | 47/81 |
| 3,866,351 | 2/1975 | Cobia | 47/81 |
| 3,866,352 | 2/1975 | Herveung et al. | 47/81 |
| 3,885,843 | 5/1975 | Rubel | 47/81 X |
| 3,961,446 | 6/1976 | Mason et al. | 47/79 |
| 4,162,863 | 7/1979 | Gaudard et al. | 239/145 X |

FOREIGN PATENT DOCUMENTS

| 2854198 | 7/1980 | Fed. Rep. of Germany | 47/80 |
| 2018117 | 10/1979 | United Kingdom | 47/81 |

*Primary Examiner*—Robert E. Bagwill
*Attorney, Agent, or Firm*—Darby & Darby

[57] ABSTRACT

A device for watering plants which utilizes a capillary mat having an upper material layer of reduced wettability and a lower material layer of increased wettability. The mat may be supported by resilient fingers.

15 Claims, 4 Drawing Figures

PLANT WATERING AND HUMIDIFYING APPARATUS

The present invention relates to an apparatus for watering and humidifying plants, particularly for use in an indoor environment.

The raising of house plants has become an increasingly popular pastime and hobby. In the display of such plants, whether at the nursery or store where the plants are sold to the customer, or in the customer's home, it is desirable to provide the plants with proper water and humidity with as little trouble and effort as possible. Preferably, this should be able to be done on an infrequent a basis as possible.

The present invention relates to an improved apparatus for this purpose. In accordance with one embodiment of the invention, a tray is provided which serves as a water reservoir. The tray includes an arrangement for supporting a platform on which plants are to be placed. At least one end of the platform is spaced from an end of the tray so that water can be poured into the tray.

Placed on the platform beneath the plants is a mat of a material which has a capillary action. At least one end of the mat extends into the reservoir so that the entire surface area of the mat is welted. The mat is made of an improved layered material comprising a base layer of a material which is easily wettable and through which the water can easily pass and an upper layer which is not so easily conductive of the water. The upper layer retards and controls the evaporation of the water. It also is of a material which will not be as easily damaged or made dirty by the plant pots.

In accordance with another embodiment of the invention, the cloth is supported on a base which has a number of spaced apart projecting fingers. The base is either placed in a tray or else its periphery is sealed to form a self-contained tray. The mat communicates with the water in the tray.

The use of capillary type material for the lower layer of the composite mat is known but, however, such mats have suffered the disadvantages of being more readily damaged and dirtied by the pots. Further, these mats were very soggy to the touch of the user.

A type of composite watering mat is shown in German Pat. No. 2158366. In that patent, tubes run beneath a layer of cloth and the tubes supply the water to the mat.

It is therefore an object of the present invention to provide a plant watering and humidifying apparatus comprising a tray serving as a reservoir for water on which a platform rests, the platform having thereon a mat of a layered material on which the plant pots are placed.

A further object is to provide an improved mat for a plant watering apparatus of a layered construction including a bottom layer of a material which is highly conductive to the water and an upper layer of a more tightly woven fabric to provide durability to the mat.

An additional object is to provide a novel supporting structure for plant pots and a watering mat in which the structure has a large number of resilient fingers which form the support.

An additional object is to provide a plant watering and humidifying apparatus in which the watering mat rests on a base formed by a number of upwardly extending fingers.

Other objects and advantages of the present invention will become more apparent upon reference to the following specification and annexed drawings, in which.

Figure 1:
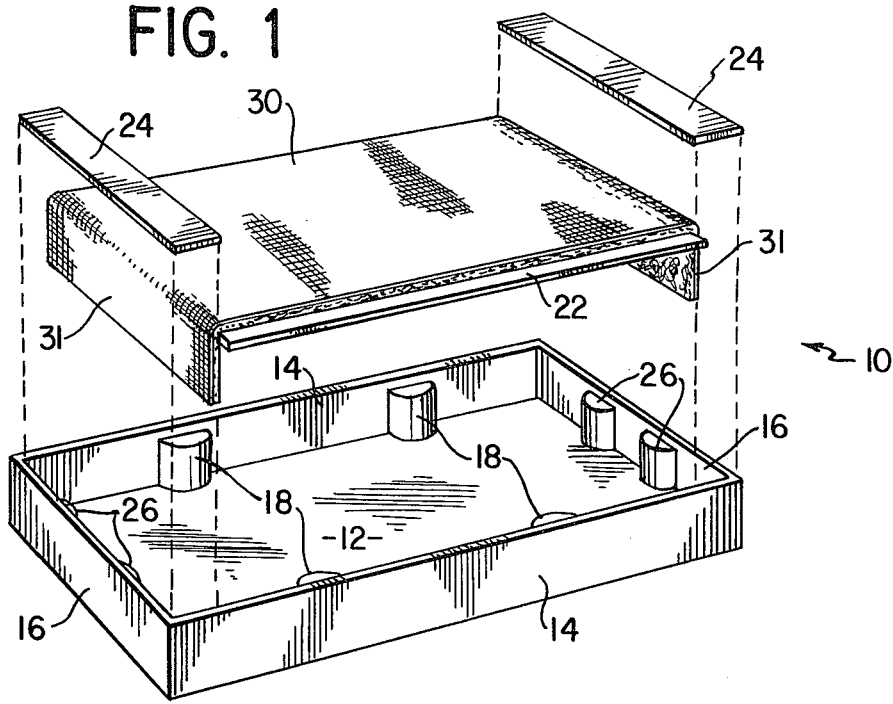
FIG. 1 is an exploded perspective elevational view of the watering apparatus.

In FIG. 1, the apparatus includes a tray 10 of plastic or other suitable material of any desired shape, e.g. rectangular, square, round, for holding water. The tray has a bottom wall 12, side walls 14 and end walls 16.

A plurality of support posts 18 are formed on the interior of each of the side walls 14 for supporting a platform 22 which also is preferably of a sheet plastic material. The platform is preferably made of shorter length than the tray so that when it is rested on the support posts 18, there will be an opening at one or both ends (as shown) through which water can be added to the tray. Each opening can be covered by a cover member 24 which rests on posts 26 on one end wall and on the platform.

Figure 2:
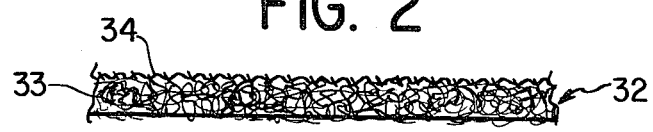
FIG. 2 is a cross-sectional view of the improved mat.

A capillary mat 30 is placed on the platform and extends over its length. One of both ends 31 of the mat extend over the corresponding end or ends of the platform and dips into the water in the reservoir. As shown more clearly in FIG. 2, the mat 30 is a composite structure. It embodies a base layer 32 of a fibrous material which has a high degree of capillarity, i.e. will conduct water readily. Suitable materials for the base layer 32 are non-woven materials of polyester, rayon polyester, acrylics, cotton batting, etc. These materials are soft and have a pile 33. Thus, they have a high degree of capillary action.

On top of the base layer 32 is an upper surface layer 34 of a material which has less of a capillary action to the water. The material for the upper layer can be, for example, woven nylon. Such a material is more of a woven nature and does not have a pile characteristic, making it somewhat "harder" than the base layer. Therefore, it is more wear resistant. That is, it is not damaged or abraded as easily as the pile-like material 32 by a pot. In addition, due to the woven nature of the upper surface layer 34 the evaporation of water from the mat 30 is under greater control. Since the upper layer 34 does not have as many exposed fibers as the pile-type base layer 32, the amount of water available at the surface of the mat is reduced.

In forming the composite mat 30, the two layers are preferably bonded to each other by an adhesive which is pressure and heat sensitive and is not affected by water. In a preferred embodiment of the invention, the nylon material 34 has a resin, such as a polyamide, impregnated or coated on its surface. The application of heat sets the resin and bonds layer 34 to layer 32.

It is also preferred that the upper layer be of a darker color, e.g. green, dark gray, or black. The woven upper surface permits dirt to be wiped from the mat. The darker color makes the mat look less unsightly when there is dirt.

In use, the composite mat 30 is placed on the platform 22 so that one end dips into the reservoir 10 and into the water. The water moves by capillary action throughout the base layer 32 of the entire area of the mat and into and through the upper surface layer 34. The plant pots (not shown) are placed on the upper surface layer of the mat and are supported by the platform 22. The water from the mat enters the plant pot through the hole in the bottom or by passing through the pot itself, depending upon the material of the pot. Thus, the plant solid receives water. In addition, the entire surface of the mat provides humidity to the foliage of the plants on the platform. This is highly beneficial to plant growth. As seen in FIG. 1, the reservoir 12 can be filled merely by removing one of the covers 24 and it is not necessary to remove the platform 22.

Figure 3:
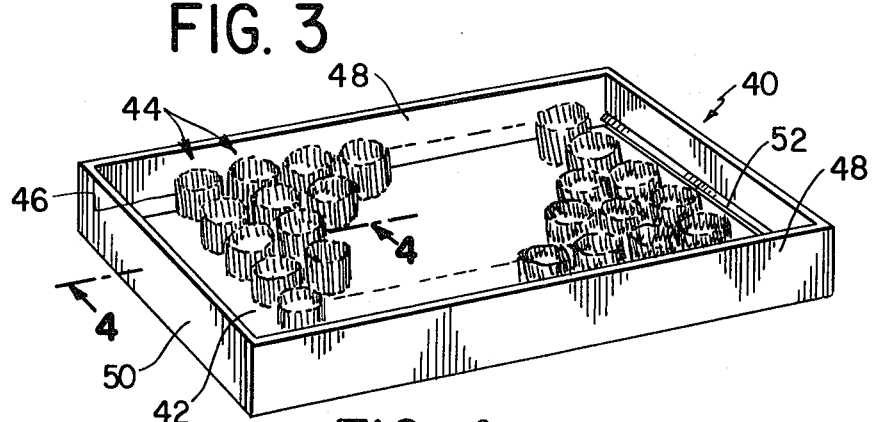
FIG. 3 is an elevational view of a further embodiment of the invention.
Figure 4:
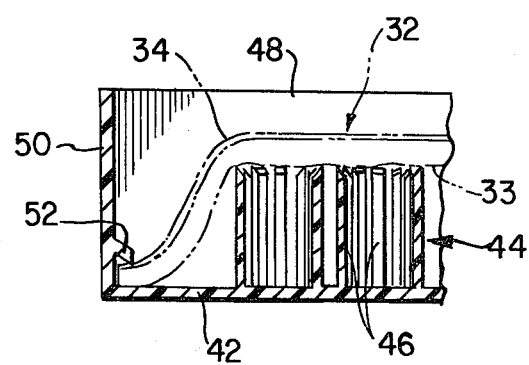
FIG. 4 is a fragmentary cross-sectional view of the embodiment of FIG. 3.

FIGS. 3 and 4 show a further embodiment of the invention which eliminates the need of the platform 22 and can also eliminate the need for a separate tray to hold the water. In this embodiment, a base 40 is utilized which has a continuous lower surface 42 on which is formed a plurality of clusters 44 of upwardly extending fingers 46. The base 40 is made of a suitable plastic material, for example, polyethelene, polypropylene, ABS, etc., and can be injection molded. The clusters 44 of fingers 46 are formed over the entire lower surface 42. The fingers 46 of each cluster 44 are arranged in a generally circular configuration, although other configurations can be used. The fingers extend upwardly and, while they are relatively thin and can be bent from side to side, they have considerable resistance with respect to a force or weight, which is applied in a downward direction. That is, the cluster of fingers can support an object placed on top of them.

A typical diameter for a cluster 44 is about ½-¾ inches and the height of the fingers can be about ½-1 inch. Of course, other dimensions can be used. The thickness of the fingers determines their strength, with there being a compromise of thickness versus cost. While arranging the fingers in clusters can reduce cost by reducing the number of fingers. The fingers can be arranged in a random or regular pattern over the entire surface of the base, such as like "grass".

The mat 30 is placed on top of the fingers and the plant pot or pots are in turn placed on top of the mat.

To provide water to the mat 30, the base 40 can be placed in a separate tray of a configuration corresponding to that of the mat but made slightly larger. The tray is filled with water which fills the spaces between the clusters 44. The water level is preferably below the tips of the fingers. One or both ends and/or sides of the mat are folded around the ends and/or sides of the base 40. Thus, the mat is in communication with the water and is wetted in the manner previously described.

The fingers 46 have several advantages. They raise the plant pots above the water level and provide a supporting surface for the mat and pots without the need and cost of a separate platform.

As indicated, the base 40 can be placed in a separate tray. As an alternate to this and as shown, the base 40 is made as an integral unit with side and end walls 48 and 50 to form an integral reservoir and support unit. In this embodiment, one or more rows of clusters 44 of the periphery of at least one of side or end walls of the base are preferably omitted so that the edges of the mat can be turned down into the portion of the unit where the water is to be held.

As seen in FIG. 4, a lip 52 is provided on the inside of one of the walls so that the end of the mat 30 can be placed thereunder to be held.

In operation, water is placed into the separate tray or integral tray to a height below the tops of the fingers 46. The water is absorbed by capillary action into the mat.

The plants are placed on top of the mat and are watered and humidified in the manner previously described.

What is claimed is:

1. Apparatus for watering and humidifying plants comprising:
    a tray for holding water,
    support means within said tray,
    a mat on said support means at least a part of which is adapted to dip into the tray to communicate with the water therein,
    said mat formed by a composite of a lower layer of a fabric of a pile-type material to conduct water by a wicking action and an upper layer of a harder finish than the lower layer to conduct water but at a lesser rate than said lower layer and to protect the lower layer.

2. Apparatus as in claim 1 wherein said upper and lower layers of said mats are bonded together.

3. Apparatus as in claim 1 wherein said bottom layer of said mat is a non-woven fabric.

4. Apparatus as in claim 3 wherein said non-woven fabric is of a polyester material.

5. Apparatus as in claim 3 wherein said upper layer is a woven fabric.

6. Apparatus as in claim 5 wherein said woven fabric is nylon.

7. Apparatus as in claim 1 wherein said support means comprises:
    a platform on which said mat rests,
    a plurality of posts for supporting said platform,
    said platform being spaced from at least one edge of the tray to permit water to be placed into the tray.

8. Apparatus for watering and humidifying plants comprising:
    a tray for holding water,
    and support means within said tray for holding a mat which conveys water by capillary action, said support means comprising a base member having a plurality of spaced resilient fingers extending upwardly therefrom.

9. Apparatus as in claim 8 wherein said fingers are arranged in clusters on said base member.

10. Apparatus as in claim 8 wherein said support means and said tray are formed as an integral unit.

11. Apparatus as in claim 8 wherein said support means is of plastic.

12. Apparatus for watering and humidifying plants comprising:
    a tray for holding water,
    support means formed by a base member having a plurality of spaced resilient fingers extending upwardly therefrom,
    a mat on said resilient fingers of said support means at least a part of which is adapted to dip into the tray to communicate with the water therein,
    said mat formed by a composite of a lower layer of a fabric having a pile to conduct water and an upper layer of a material which also conducts water but of a harder finish than the lower layer to protect the lower layer.

13. Apparatus as in claim 12 wherein said base member and said tray are integrally formed as a unit.

14. Apparatus as in claim 12 wherein said fingers are arranged in clusters.

15. Apparatus as in claim 12 wherein said lower layer conducts water by a wicking action and said upper layer conducts water at a lesser rate than said lower layer.

* * * * *